Oct. 25, 1955  R. W. GREENLUND  2,721,437
SPRAYING APPARATUS FOR LAWN MOWERS
Filed Feb. 25, 1954
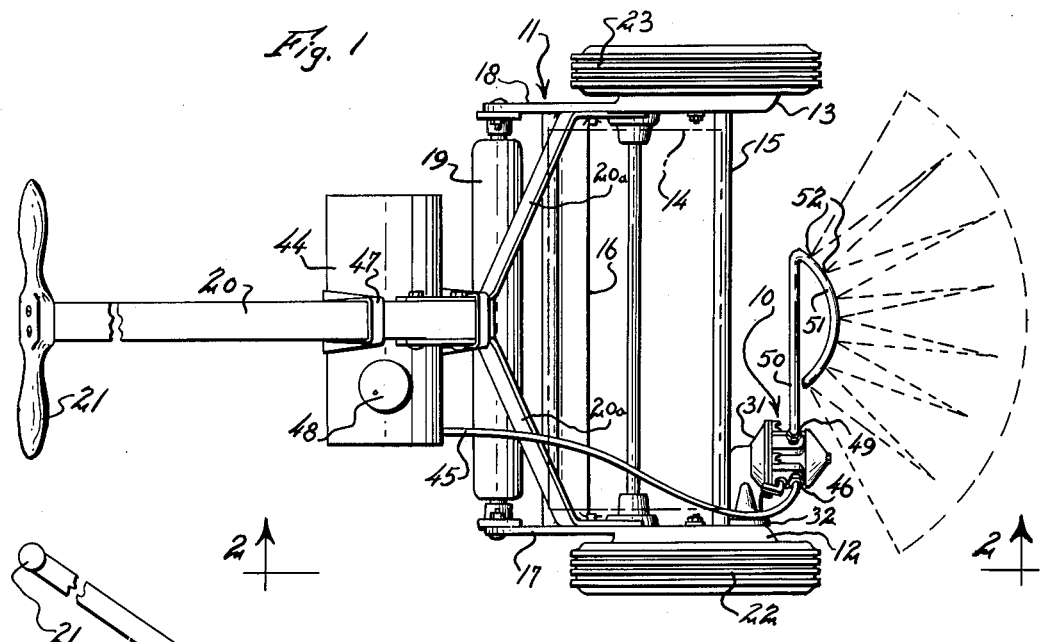
INVENTOR.
RICHARD W. GREENLUND
BY Williamson, Williamson,
Schroeder & Adams
ATTORNEYS United States Patent Office 2,721,437
Patented Oct. 25, 1955

2,721,437

SPRAYING APPARATUS FOR LAWN MOWERS

Richard W. Greenlund, Minneapolis, Minn.

Application February 25, 1954, Serial No. 412,507

6 Claims. (Cl. 56—249)

This invention relates to a spraying apparatus for lawn mowers and more particularly to a device which may be easily adapted to conventional lawn mowers and operated thereby.

I am aware of certain prior art devices which comprise a combinative structure having both lawn cutting means and spraying means in conjunction therewith. Such devices however are generally operated by a common source of power and the combined unit is ponderous and expensive. To the best of my knowledge no simple and easily adaptable device has heretofore been proposed which may be operatively mounted upon a simple and conventional manual lawn mower so as to achieve spraying proportionate to the rate of travel of the lawn mower, the entire device being inexpensive and devoid of complicated drive mechanism and special mounting structures.

My invention contemplates as an important object the provision of an inexpensive and positive spray device which will treat grass and the like with liquid applied proportionally to the speed of the mower at the same time the grass is being mowed, the sprayed liquid being provided for such purposes as killing weeds, fertilizing the ground, destroying insects and fungus, and the like.

It is another object of the invention to provide a sprayer which will apply a controlled amount of liquid in the projected path of a conventional lawn mower, the liquid being fed by a pump which is actuated simply and directly by one of the drive wheels conventionally employed in an ordinary lawn mower.

It is a further object of the invention to provide a dual function for the hub of a conventional drive wheel on a lawn mower in not only driving the cutting mechanism but also actuating a spray pump of my attachment mechanism, and a further dual function in utilizing the drive wheel housing for protecting the moving parts of my attachment from cuttings, dirt and the like while also providing a natural and conventional mount for the pump element.

These and other objects and advantages of my invention will more fully appear from the following description made in connection with the accompanying drawings wherein like reference characters refer to similar parts throughout the several views and in which:

Fig. 1 is a top plan view of a conventional lawn mower with my device secured thereto in operative relation, the usual blades of the reel structure being omitted for clarity and the general outline thereof being indicated by broken lines;

Fig. 2 is a side elevation of my device, the hubbed wheel and a portion of the housing being exposed by vertical sectioning on line 2—2 of Fig. 1;

Fig. 3 is an enlarged detail of a segment of Fig. 2 showing the cam connection between the cammed hub of the wheel and the oscillatable extension of the pump, the view constituting a fragmentary view partly in section;

Fig. 4 is an enlarged fragmentary portion of the cam mechanism taken on the line 4—4 of Fig. 3, portions being shown in section and others in full line.

Referring now to the drawing, my invention contemplates a particular combination of an attachment device indicated generally at 10 to a conventional lawn mower indicated generally at 11. The lawn mower is of standard construction and, in most instances, is of the manual type having a housing structure comprising a right member 12 and a left member 13. In some instances these housings are identical in structure although not necessarily so for the purpose herein described. Rotary cutting mechanism indicated generally at 14 is journaled between the conventional housing members 12 and 13 and may comprise a cutting reel the outline of which is designated schematically, and a bladed element 16 as shown in Fig. 1. Additionally, the framework 15, including the wheel housings 12 and 13, may have rearward slotted extensions 17 and 18 across which may be adjustable and rotatably mounted a roller 19 as indicated in Fig. 2 for determining the depth of cut during the mowing operation, all as is well known in the art. The wheel housings 12 and 13 are likewise secured to a handle 20 by means of attaching brackets 20a having limited pivot movement for transmitting a position force to the entire device. The handle 20 has at its outer extremity a pair of hand grips 21 as shown in Figs. 1 and 2. A wheel 22 having a hubbed center is mounted to the wheel housing 12 and another wheel 23 is rotatably mounted to the housing 13. The wheel contains as a part thereof an annular internal gear ring 24 as shown in Fig. 2, the gear ring 24 intermeshing with a small gear 25 which in turn is journaled through the housing 12 and is adapted to drive the cutting mechanism 14 through shaft 26. The wheel member 23 may be identical to that indicated at 22 but only one of the wheels will be disclosed in detail since it is contemplated that only one will be utilized to accomplish the actuation of my spraying attachment as shown.

The usual hub structure associated with the wheel 22 is circular and is attached to the wheel 22 at a position forwardly of the section line 2—2 of Fig. 1. My invention contemplates an adaptation of the hub 27 to a special driving connection with my spraying attachment. The usual circular outline of the hub member is indicated by the dotted lines in configuration 28 as shown in Fig. 3. One means of adapting the hub member for driving my device consists in grinding down portions of the hub surface to form flattened areas 29 and lobed areas 30 in between the areas 29. It is understood of course that other means of adapting the hub 27 of wheel 22 could be employed so as to accomplish a driving connection between the wheel and the spraying attachment 10. In any event I do not contemplate the necessity of interchanging or adding new elements with or to the elements of the conventional lawn mower insofar as the present cutting operation is concerned. My invention can therefore constitute a simple attachment to a conventional lawn mower in which minimum changes need be made such as the formation of a cam surface on the conventional hub 27 and the formation or cutting of several openings through the housing as will be presently described.

The pump element of my attachment is shown at 31 and may comprise any conventional fluid type pump of the class operable by reciprocable means and adapted to deliver a sufficient head of fluid to create a spray of finely divided fluid particles. I prefer to use a pump of the diaphragm type in which the oscillation of a diaphragm coupled with valving members will cause the flow of fluid therethrough in a positive manner. The pump 31 has a mounting bracket 32 which adapts itself to securing to the wheel housing 12 by such means as bolts 33 as shown in detail in Fig. 3. It is understood that holes may be formed in the plate of the wheel housing either at the time the lawn mower is manufactured or may easily be drilled by the technician who is mounting the attachment upon the lawn mower.

The pump has an oscillatable member 34 which is adapted to extend into the wheel housing 12 through an opening 35 which is formed through the outer plate thereof, the said oscillatable member having a driving connection with the cammed hub 27 as previously noted.

The driving connection may be accomplished through a swingable member 36 which in turn comprises an arm 37 pivotally mountable to a pin 38 secured to the inside of housing plate 12 and an upper transverse portion rigidly formed therewith and indicated at 39. The upper member 39 in turn has rotatably mounted thereon a cam follower 40 which, in the instant case, is a wheel element journaled on shaft 41 secured across a bifurcated portion of the member 39. The wheel 40 is adapted to ride on the cam surface 29—30 of hub 27 and transmits swinging motion to the member 36 about the pivot point 38. The rearward end of member 39 is in opposed relation to the cam follower 40 and bears an adjustable abutment 42 which may be threadably mounted as shown in Figs. 3 and 4 with a set screw 43 to maintain the adjusted position of abutment 42 which is adjusted depending on the relative dimensions of the wheel and hub members on the particular conventional lawn mower employed. Where a diaphragm pump 31 is employed the oscillatable extension 34 has spring resistance (not shown) and the throw of the cam 40 and swingable member 36 transmits movement to the oscillatable extension 34 so as to operate the pump 31. In the instant case four lobes 30 are provided on the cammed hub and hence the oscillatable extension 34 will be actuated four times for each rotation of ground contacting wheel 22.

A fluid supply line comprises a container 44 and a conduit 45 in fluid connection with the container 44 and with the inlet 46 of pump 31. The container 44 is preferably mounted to handle 20 of the lawn mower by such means as brackets or straps 47 and may be provided with an upstanding capped filling spout 48 as shown. For most purposes a tank of a few quarts capacity is adequate.

Pump 31 is also provided with an outlet 49 to which is secured a delivery conduit or tube 50 as shown in Fig. 1. Tube 50 in turn terminates in a spray head 51 which may have a plurality of spaced openings 52 disposed along an arcuate portion of spray head 51 and preferably directed forwardly and downwardly as shown in Fig. 2. The spray head 51 is mounted above and forwardly of the cutting mechanism 14 so as to spray fluid forwardly of the mower and before the cutting mechanism has reached the area sprayed.

In the use and operation of my lawn cutting and spraying device the tank 44 is filled with appropriate fluid such as a weed killing mixture. The lawn mower is then utilized in the normal manner to cut grass along a projected pathway with the usual provision for slight overlapping to insure complete cutting of the lawn area. Pump 31 will be actuated as previously noted in direct ratio to the speed of the mower and will pump fluid through the fluid supply line 45 and to the delivery conduit or tube 50, thence sprayed outwardly from spray head 51 so as to be applied uniformly across the same width of the lawn which is about to be cut by the cutting mechanism. It will be noted that in the case of weed killing spray, the cuttings will be sprayed with fluid as well as the remaining portions of the grass blades. The cut portions of the grass blades will therefore fall on top of and in between the uncut blade portions and assist in blanketing broad-leafed blades which are susceptible to killing through the use of liquid preparations.

It thus may be seen that I have provided a novel attachment for conventional lawn mowing equipment which will uniformly spray liquid over the entire area of a lawn at the same time that it is cut with the mower. The application of the spray is automatic both in quantity applied and in the particular area under consideration. I have found in practice that a somewhat weaker solution of weed killing liquid may be employed then under normal circumstances since the spray is applied uniformly and effectively. I have found further that repeated application of the liquid will not impair the health of the lawn grass since the mower is not employed more often then necessary to cut the grass. As previously noted, other liquids such as fertilizers and insecticides may be evenly applied with savings in quantity of liquid as well as effort exerted in the application thereof.

It will, of course, be understood that various changes may be made in the form, details, arrangement and proportions of the parts without departing from the scope of my invention which consists of the matter shown and described herein and set forth in the appended claims.

What I claim is:

1. In a lawn spraying and mowing device the combination with a conventional lawn mower having a wheel housing structure, rotary cutting mechanism journaled thereacross and hubbed ground contacting wheels mounted on said wheel housing structure, of a fluid pump mounted on said wheel housing structure in opposed relation to one of said wheels and having an oscillatable member extending inwardly through said wheel housing and terminating in a driving connection with the hub of said wheel, a fluid supply line leading to said fluid pump, and a delivery conduit terminating in a spray head upwardly and forwardly of the rotary cutting means.

2. In a lawn spraying and mowing device, the combination with a conventional lawn mower having a wheel housing construction, and rotary cutting mechanism journaled across the wheel housing structure, of a pair of ground contacting wheels, at least one of which is provided with a hub having a cammed surface lying within said wheel housing, a fluid pump mounted on said wheel housing in opposed relation to said wheel, said pump having an oscillatable member extending through said wheel housing to the internal space therein and terminating in a cam follower in contact with the said cammed surface of said hub, a fluid supply line leading to said pump, and a delivery conduit terminating in a spray head positioned upwardly and forwardly of the rotary cutting means.

3. A lawn mowing and spraying device having in combination a conventional lawn mower with a horizontal cutting reel, a wheel housing structure at each side of cutting reel and adapted to rotatably receive the wheel, a hubbed ground contacting wheel mounted on each wheel housing, a cam formed on said hub, a fluid pump mounted externally of said wheel housing and having an oscillatable extension terminating within said housing, a cammed follower mounted for swinging movement within said wheel housing and interconnecting said cam and said oscillatable member whereby rotation of said wheel during the lawn mowing operation will cause a proportionate pumping of fluid through said spray head and into the projected pathway of the lawn mower.

4. In a lawn mowing and spraying device the combination of a conventional lawn mower having a wheel housing at each side, a cutting reel rotatably disposed across said housing, a hubbed ground-contacting wheel mounted on each of said wheel housings, and a handle secured to said wheel housings, a cam element formed on the hubbed portion of one of said wheels, a fluid pump mounted on the wheel housing associated with said wheel and in opposed relation, said pump having an oscillatable member for actuating the pump extending inwardly of said housing, a cam element interconnecting said hubbed cam and the oscillatable member, a fluid supply tank mounted on the handle of said lawn mower and having a conduit leading to said fluid pump, and a delivery conduit terminating in a spray head disposed upwardly and forwardly of the rotary cutting element for delivering fluid and cutting the lawn along a projected path and in proportion relative to the speed of travel thereover.

5. An attachment device for conventional lawn mowers having a pair of wheel housings, a cutting mechanism disposed between said housing, and a pair of hubbed ground contacting wheels mounted respectively on said wheel housings, said attachment comprising a fluid pump mounted on one of said wheel housings and having an oscillatable member extending to the internal space within said housing, a driving connection interposed between said hubbed wheel and the oscillatable member to oscillate the same and thereby actuate the fluid pump, a container for holding a source of fluid for said pump, and a delivery conduit terminating in a spray head upwardly and forwardly of the cutting mechanism whereby operation of said lawn mower along a projected path will likewise operate proportionally said fluid pump in spraying the same pathway traversed by the lawn mower.

6. An attachment for a conventional lawn mower having a pair of wheel housings, cutting mechanism journaled across said wheel housings and a hubbed ground contacting wheel mounted respectively on each of said wheel housings, said attachment comprising a fluid pump mounted on one of said wheel housings in opposed relation to the hubbed wheel associated therewith, an oscillatable extension on said pump adapted to extend through said wheel housing, a cam following member adapted to be mounted within said wheel housing for interconnecting said hubbed wheel and said oscillatable member, a cam element adapted to be formed on the hub of said wheel to actuate said cam follower, a fluid supply line leading to the pump, and a delivery line terminating in a spray head upwardly and forwardly of the cutting mechanism, whereby fluid will be sprayed from said spray head over the projected path of the lawn mower and at a rate proportional to the speed of travel of said lawn mower.

References Cited in the file of this patent

UNITED STATES PATENTS

| | | |
|---|---|---|
| 2,044,884 | Keller | June 23, 1936 |
| 2,246,866 | Striebling et al. | June 25, 1941 |
| 2,518,771 | Gol | Aug. 15, 1950 |
| 2,573,784 | Asbury | Nov. 6, 1951 |